United States Patent
Hsieh et al.

(10) Patent No.: US 8,868,811 B2
(45) Date of Patent: Oct. 21, 2014

(54) SYSTEMS AND METHODS FOR HOT-PLUG DETECTION RECOVERY

(75) Inventors: Ping-Huei Hsieh, New Taipei (TW); Yi-An Chen, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 205 days.

(21) Appl. No.: 13/251,588

(22) Filed: Oct. 3, 2011

(65) Prior Publication Data

US 2013/0086292 A1 Apr. 4, 2013

(51) Int. Cl.
*G06F 13/00* (2006.01)
*G06F 13/24* (2006.01)
*G06F 3/14* (2006.01)
*G09G 5/00* (2006.01)
*G09G 5/36* (2006.01)

(52) U.S. Cl.
CPC *G06F 3/14* (2013.01); *G09G 5/363* (2013.01); *G09G 2330/08* (2013.01); *G09G 2370/04* (2013.01); *G09G 2370/10* (2013.01); *G09G 2330/026* (2013.01); *G09G 5/006* (2013.01)
USPC .......................... 710/302; 710/104; 710/260

(58) Field of Classification Search
USPC ....................................................... 710/302
See application file for complete search history.

(56) References Cited

U.S. PATENT DOCUMENTS

| | | | | |
|---|---|---|---|---|
| 5,631,952 A * | 5/1997 | O'Barr et al. | ............. | 379/93.01 |
| 5,745,763 A * | 4/1998 | Mealey et al. | ................ | 719/321 |
| 5,978,857 A * | 11/1999 | Graham | ........................ | 719/312 |
| 6,738,846 B1 * | 5/2004 | Slaughter et al. | ............. | 710/260 |
| 7,461,247 B2 * | 12/2008 | van der Veen et al. | ............. | 713/2 |
| 7,503,049 B2 * | 3/2009 | Kanemura et al. | ............. | 718/108 |
| 7,853,731 B1 * | 12/2010 | Zeng | ................ | 710/18 |
| 2003/0208675 A1 * | 11/2003 | Burokas et al. | ..................... | 713/1 |
| 2004/0041832 A1 * | 3/2004 | Nguyen et al. | ................ | 345/736 |
| 2007/0016832 A1 * | 1/2007 | Weiss | ............................ | 714/100 |
| 2008/0172517 A1 * | 7/2008 | Goodart et al. | .................. | 710/33 |
| 2008/0231711 A1 * | 9/2008 | Glen et al. | ..................... | 348/192 |
| 2008/0303956 A1 * | 12/2008 | Nakagawa | ..................... | 348/723 |
| 2009/0132243 A1 * | 5/2009 | Suzuki | ......................... | 704/216 |
| 2010/0057966 A1 * | 3/2010 | Ambikapathy et al. | ....... | 710/260 |
| 2010/0169968 A1 * | 7/2010 | Shanbhogue et al. | ......... | 726/22 |
| 2010/0289950 A1 * | 11/2010 | Kobayashi | .................... | 348/469 |
| 2010/0303187 A1 * | 12/2010 | Kobayashi et al. | ........... | 375/376 |
| 2011/0047308 A1 * | 2/2011 | Nagaura et al. | ............... | 710/260 |
| 2011/0153893 A1 * | 6/2011 | Foong et al. | .................. | 710/268 |
| 2011/0191480 A1 * | 8/2011 | Kobayashi | .................... | 709/227 |
| 2012/0203937 A1 * | 8/2012 | Mohanty et al. | ................ | 710/16 |
| 2013/0050216 A1 * | 2/2013 | Whitby-Strevens et al. | . | 345/428 |

FOREIGN PATENT DOCUMENTS

| | | | | |
|---|---|---|---|---|
| CN | 102801944 A | * | 11/2012 | ............. H04N 5/765 |
| CN | 202840186 U | * | 3/2013 | ............. H01R 31/06 |
| JP | 03262049 A | * | 11/1991 | ............. G06F 11/28 |
| JP | 04095148 A | * | 3/1992 | ............. G06F 13/10 |

\* cited by examiner

*Primary Examiner* — Faisal M Zaman
(74) *Attorney, Agent, or Firm* — McClure, Qualey & Rodack, LLP

(57) ABSTRACT

One embodiment is a method for establishing a link between a source device and a sink device. The method comprises enabling a hot plug detect (HPD) handler in the source device, utilizing the HPD handler to receive an HPD interrupt upon the sink device being coupled to the source device, applying one or more predetermined parameters corresponding to the HPD interrupt to establish the link between the source device and the sink device, and adjusting the one or more predetermined parameters if the link between the source device and the sink device is not established.

20 Claims, 7 Drawing Sheets

SYSTEMS AND METHODS FOR HOT-PLUG DETECTION RECOVERY

TECHNICAL FIELD

The present disclosure generally relates to a hot plug detection recovery mechanism.

BACKGROUND

The DisplayPort standard is a digital display interface standard that specifies the connection between a source device (e.g., computer) and a sink device such as a display device. DisplayPort supports both external (e.g., box-to-box) and internal (e.g., laptop LCD panel) connections. The data transmission protocol defined in the DisplayPort standard is based on micro data packets and involves a variable number of data pairs with a clock signal embedded in the data signal. The connection of a source device to a sink device is established by a link training process, where an appropriate number of lanes is enabled at the right link rate via handshaking that takes place between the source device and sink device over an auxiliary channel (AUX CH). However, a fast link training process is not supported by all sink devices, and link training may be lost when connecting a sink device to a source device under certain conditions.

SUMMARY

Briefly described, one embodiment, among others, is a method for establishing a link between a source device and a sink device. The method comprises enabling a hot plug detect (HPD) handler, utilizing the HPD handler to receive a HPD interrupt from the sink device upon the sink device being coupled to the source device, applying one or more predetermined parameters corresponding to the HPD interrupt to establish the link between the source device and the sink device, and adjusting the one or more predetermined parameters if the link between the source device and the sink device is not established.

Another embodiment is a hardware apparatus for establishing a link between a source device and a sink device. The apparatus comprises an enable module, a memory, and a control module. The enable module is configured to receive an enable command from the source device to enable the hardware apparatus. The memory stores one or more sets of predetermined parameters. The control module is electrically coupled to the enable module and the memory, and configured to receive a hot plug detect (HPD) interrupt from the sink device upon the sink device being coupled to the source device. The control module applies the one or more predetermined parameters corresponding to the HPD interrupt to establish the link between the source device and the sink device. Preferably, the control module adjusts the one or more predetermined parameters if the link between the source device and sink device is not established.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
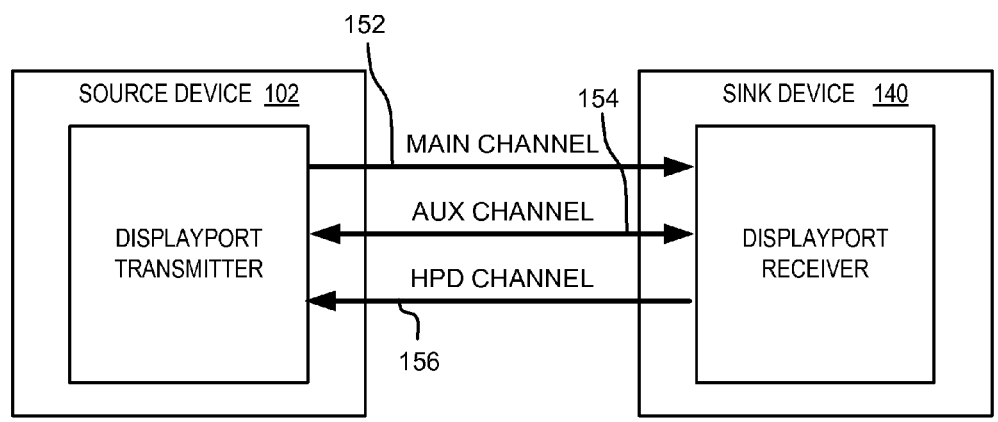
FIG. 1 illustrates various links extending between a source device and a sink device.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

The DisplayPort standard is a digital display interface standard defined by the Video Electronics Standards Association (VESA) that specifies the connection between a source device (e.g., computer, workstation) and a sink device such as a display device. The DisplayPort standard supports both external (e.g., box-to-box) and internal (e.g., laptop LCD panel) connections. The data transmission protocol defined in the DisplayPort standard is based on micro data packets and involves a variable number of data pairs with a clock signal embedded in the data signal.

Reference is made to FIG. 1, which illustrates various links extending between a source device 102 and a sink device 140. As shown, a DisplayPort link comprises various signal lines including a main channel 152, an auxiliary (AUX) channel 154, and a hot plug detect (HPD) channel 156. The main channel 152 provides a unidirectional path from the source device 102 to the sink device 140, and is a high bandwidth/low latency channel used for transmission of isochronous audio/video (A/V) streams. The main channel 152 may comprise 1, 2, or 4 pairs or lanes, where each lane is capable of supporting an application bandwidth up to 270 MB/sec. There is no dedicated channel for forwarding a clock signal. Instead, the link clock is extracted from the data stream itself, which is encoded according to ANSI8B/10B encoding.

Both the source device 102 and the sink device 140 are typically configured to support a minimum number of lanes, depending on the resources needed. Furthermore, a device configured to support 4 lanes must also be able to support 1 or 2 lane applications. When fewer than the total available lanes are enabled, the lanes with lower assigned numbers are given priority. The AUX channel 154 is a bidirectional channel used for link management and device control. In the configuration shown in FIG. 1, the source device 102 acts as the master, and the sink device 140 acts as the slave. AUX channel transactions begin with a synchronization pattern, which is normally initiated by the source device 102. However, a sink device 140 may initiate an AUX channel transaction by sending an interrupt request (IRQ) to the source device 102 where such an IRQ may be toggled by asserting a HPD signal on the HPD channel 156. The HPD signal is a unidirectional line signal that serves as an interrupt request (IRQ) originated by the sink device 140.

The connection between a source device 102 and a sink device 140 is established by a link training operation, where link training involves enabling an appropriate number of lanes at a link rate specified via handshaking that occurs between the source device 102 and the sink device 140 over the AUX channel 154. After the link training is completed, the sink device 140 may transmit a link status change by toggling the HPD signal. The link training may be performed in two ways—either by full link training or by fast link training. With full link training, handshaking takes place on the AUX channel 154 to obtain DisplayPort Configuration Data (DPCD) for the sink device 140. Fast link training does not require AUX channel handshaking as the last known optimum setting is used, where the last known optimum setting comprises the configuration used to establish the DisplayPort connection. With fast link training, it is assumed that the same model of the sink device is being connected. However, as noted earlier, fast link training is not supported by all sink devices.

For instances where a DisplayPort driver is not installed or cannot be found in an operating system (OS) of the source device 102, no response is provided to the link status change relating to hot plug detection. For example, in a system incorporating a disk operation system (DOS) environment that does not support ISRs (interrupt service routines), the system will be unable to respond to a hot plug detection status. The sink device 140 will experience a blackout where no content is displayed on the sink device 140. Thus, if the sink device 140 (e.g., a display device) is not already connected to the source device 102 when the system (source device 102) begins booting up from a power-down state, an HPD interrupt is toggled from the sink device 140 to the source device 102 upon attachment of a physical cable between the source device 102 and the sink device 140.

The HPD interrupt will not be detected by the DisplayPort driver as the source device 102 is still booting up and the operating system is not fully initialized. In another scenario, the source device 102 may be inadvertently disconnected from the sink device 140 and reconnected during boot-up (for example, due to the cable being moved). The display device is unable to respond as the system is still booting up. With conventional setups, the sink device 140 does not display any content even though the sink device 140 is connected to the source device 102 as a link was not properly established between the two devices. By implementing the recovery mechanism described herein, a HPD handler detects HPD interrupts and establishes a link between the source device 102 and sink device 140 if a display driver of the display device is unavailable or not installed.

Various embodiments are described for addressing the perceived shortcomings with existing HPD configurations. A link training recovery mechanism is described for supporting HPD events in environments that do not support ISRs. In accordance with some embodiments, a hardware handler (such as a HPD handler implemented in a graphics card of the source device) for link training is incorporated to operate in place of a display driver and to address HPD interrupts when the display driver is not yet loaded or not installed.

Once enabled, the hardware based HPD handler establishes or re-establishes a DisplayPort link by utilizing last known settings or by implementing a fail-safe setting after a HPD event occurs. The fail-safe setting may comprise the application of several possible configurations to establish the link with a sink device 140 via trial and error via other mechanisms. If a display driver is not installed or if the OS simply has not been loaded onto the system, the HPD handler, rather than the display driver, detects a change of the HPD interrupt and establishes the link connection between the source device 102 and the sink device 140.

One embodiment, among others, is a method for establishing a link between the source device and a sink device. The method comprises enabling a HPD handler, utilizing the HPD handler to receive a HPD interrupt from the sink device upon the sink device being coupled to the source device, applying one or more predetermined parameters corresponding to the HPD interrupt received from the source device to establish the link between the source device and the sink device, and adjusting the one or more predetermined parameters if the link between the source device and the sink device is not established.

Another embodiment is a method implemented in a source device for establishing a link between the source device and a sink device. The method comprises enabling a HPD handler in the source device via an enable command sent from a graphics card in the source device, utilizing the HPD handler to receive an HPD interrupt from the sink device, the HPD interrupt being generated upon the sink device being coupled to the source device, applying one or more predetermined parameters corresponding to the HPD interrupt to establish the link between the source device and the sink device, applying a different set of the one or more predetermined parameters if the link is not established between the source device and the sink device, and receiving a disable command to disable the HPD handler upon establishing the link between the source device and the sink device or upon loading of a device driver corresponding to the sink device.

Figure 2:
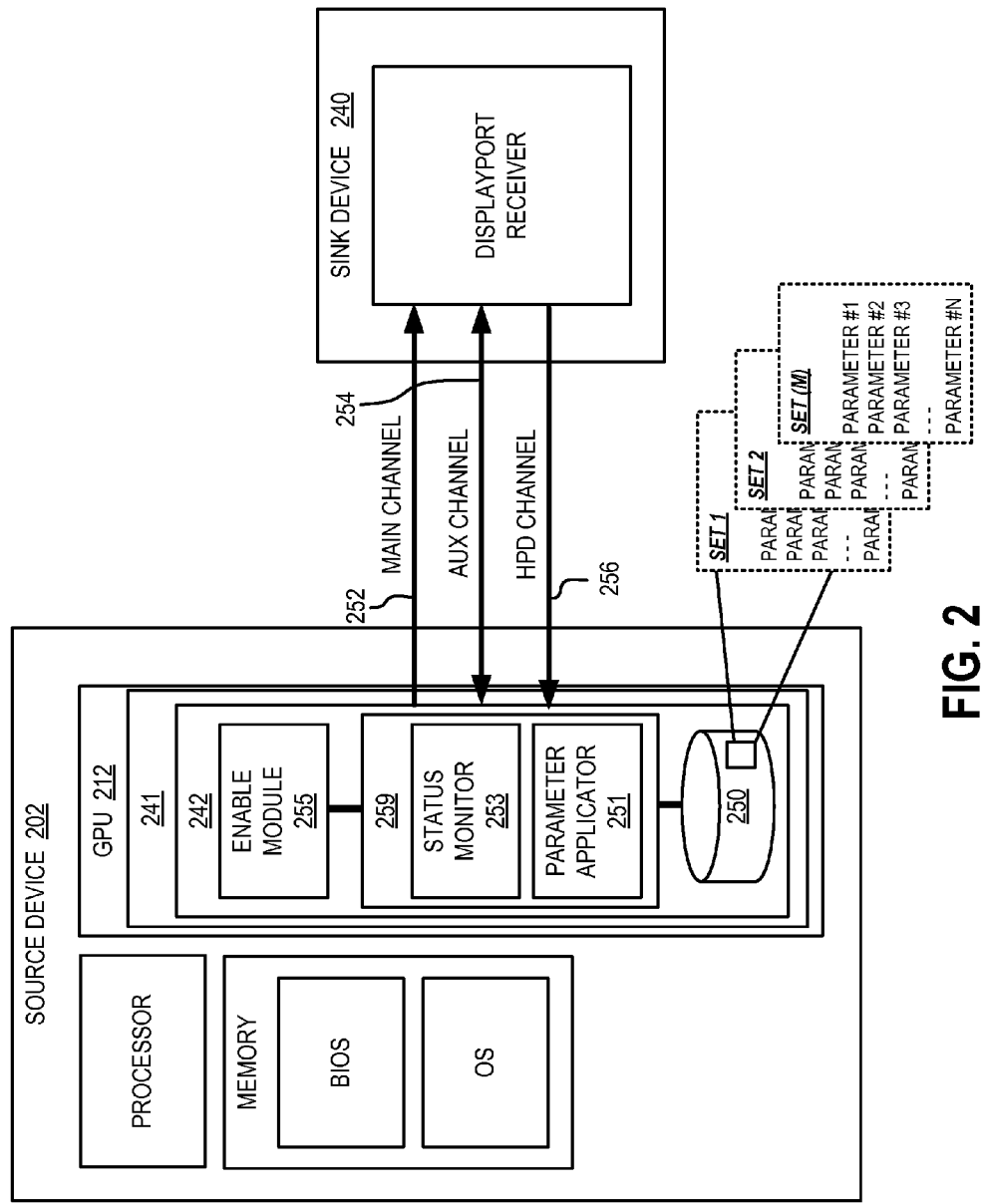
FIG. 2 depicts a source device in accordance with various embodiments for performing hot plug detection recovery.

Reference is made to FIG. 2, which illustrates a source device 202 in accordance with various embodiments for performing HPD recovery. As shown, the source device 202 comprises a DisplayPort transmitter 241, which can be implemented, for example, in a video graphics adapter or graphics processing unit (GPU) 212. The DisplayPort transmitter 241 comprises an HPD handler 242 for establishing a link between the source device 202 and the sink device 240 by responding to an HPD interrupt without a handshake process through an AUX channel 254. For exemplary embodiments, the HPD handler 242 is implemented in hardware and may be controlled by a driver to enable and disable the HPD handler 242. Specifically, the HPD handler 242 includes an enable module 255, a control module 259 and a memory 250. The enable module 255 is configured to receive an enable command or a disable command from a video basic input/basic output system (VBIOS) executing on the GPU 212. The memory 250 may store one or more predetermined parameters. The control module 259 is electrically coupled to the enable module 255 and the memory 250.

For some embodiments, the HPD handler 242 is enabled during boot-up of the source device 202. When enabled, the HPD handler 242 is configured to receive and respond to HPD interrupts toggled by the sink device 240 in cases where the display driver is not functioning or is not installed. Upon receiving an HPD interrupt, the HPD handler 242 configures a link connection via a parameter applicator 251 of the control module 259 in the HPD handler 242, where the parameter applicator 251 applies predefined settings to the graphics card for establishing the link between the source device 202 and the sink device 240 through an AUX channel 254. Preferably, the predefined settings are the one or more predetermined parameters stored in the memory 250.

Figure 4:
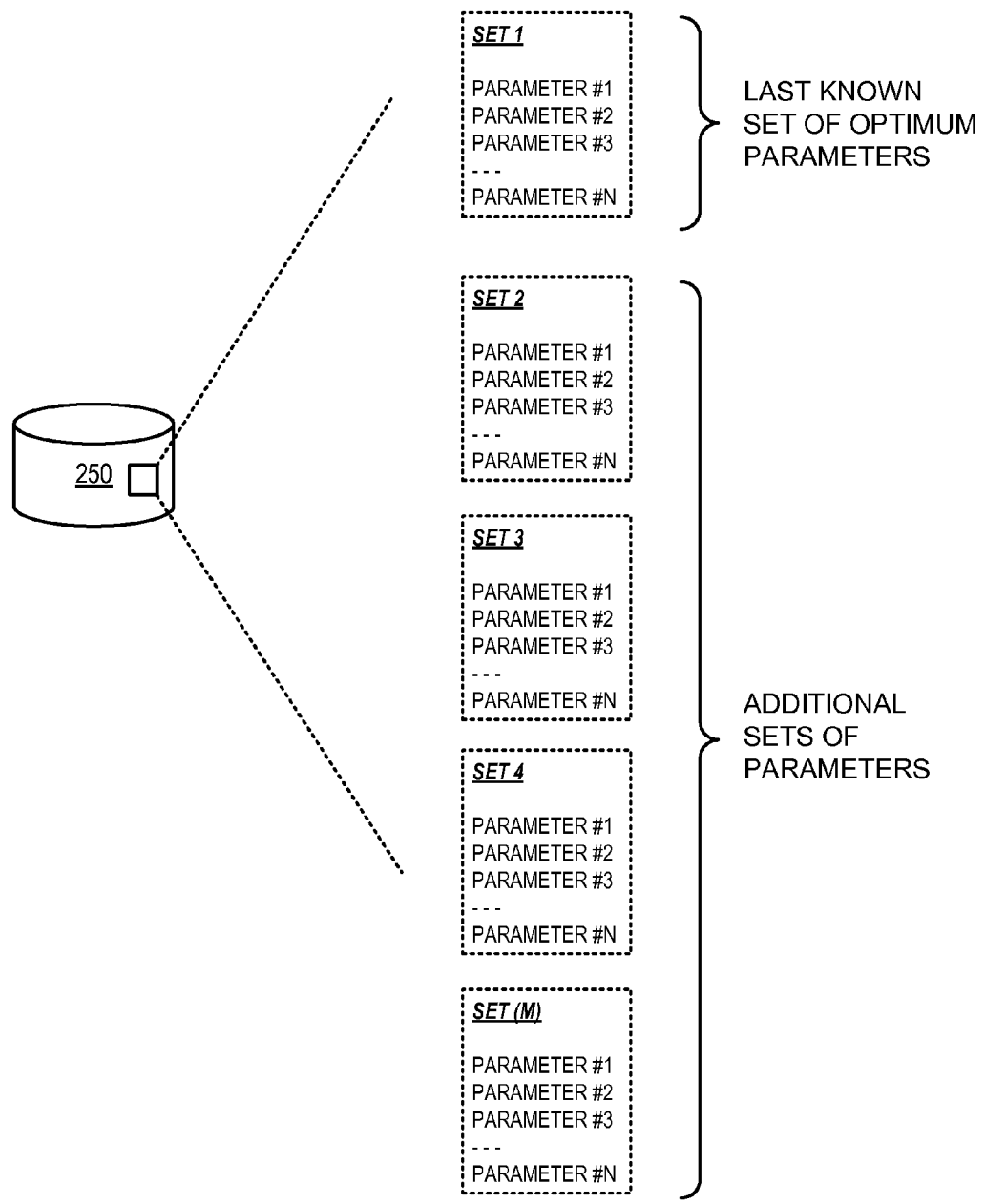
FIG. 4 shows various sets of parameters stored in the memory shown in FIG. 2.

The parameter applicator 251 may apply the one or more predetermined parameters to the graphics card for establishing the link between the source device 202 and the sink device 240. Referring briefly to FIG. 4, the memory 250 stores multiple sets of predetermined parameters for the graphics card. For some embodiments, one of the stored sets of predetermined parameters ("SET 1" in FIG. 4) comprises a set of parameters applied in successfully establishing a link between the source device 202 and the sink device 240 (or a sink device of the same model). The set of parameters applied in successfully establishing a previous link may be first employed to establish the link between the source device 202 and the sink device 240. The additional stored sets of the predetermined parameters may be based on other successful link sessions and/or specified by a third party (e.g., the manufacturer of the sink device 240 in FIG. 2).

Reference is made back to FIG. 2. A status monitor 253 of the control module 259 is configured to monitor for a change of the HPD interrupt over the HPD channel 256 to determine whether a sink device 240 has been electrically coupled to the source device 202. Preferably, the change of the HPD interrupt is a voltage level change from low to high or from high to low caused by the electrical coupling. Once the change of the HPD interrupt is detected by the status monitor 253.

For some embodiments, the parameter applicator 251 in the HPD handler 242 retrieves one or more predetermined parameters from the memory 250 and applies the one or more predetermined parameters to establish the link between the source device 202 and the sink device 240. If the link between the source device 202 and the sink device 240 is not established, the parameter applicator 251 may adjust the one or more predetermined parameters for successful linking establishment. Preferably, the parameter applicator 251 may adjust the one or more predetermined parameters on a parameter-by-parameter basis. In other words, the parameter applicator 251 may apply several possible link configurations by adjusting the one or more predetermined parameters via trial and error.

For some embodiments, the parameter applicator 251 in the HPD handler 242 retrieves one or more sets of predetermined parameters from the memory 250 and applies the sets of the predetermined parameters one by one. In other words, the parameter applicator 251 may apply a set of the predetermined parameters among the one or more sets of the predetermined parameters to establish the link between the source device 202 and sink device 240. For some embodiments, a previous link between the source device 202 and the sink device 240 has been established by the HPD handler 242. The HPD handler 242 may immediately store one or more parameters corresponding to the previous link in memory 250 as a well-known optimum set.

If the HPD handler 242 is enabled to establish a current link between the source device 202 and the sink device 240, the well-known optimum set may be applied first as the one or more predetermined parameters for establishing the current link between the source device 202 and the sink device 240. The set of the predetermined parameters applied first comprises one or more parameters used for establishing a previously established link between the source device 202 and the same sink device 240 (or the same model). The parameter applicator 251 may also retrieve and apply another set among the sets of the predetermined parameters if the link between the source device 202 and sink device 240 is not established. If application of one of the groups of settings results in the link being successfully established, the parameter applicator 251 in the HPD handler 242 stops retrieving parameters from the memory 250. If none of the stored sets of the predetermined parameters results in a successful link being established between the source device 202 and the sink device 240, the HPD handler 242 may be configured to then make adjustments on a parameter-by-parameter basis among the stored sets of the predetermined parameters until the link is established.

For some embodiments, the predetermined parameters comprise voltage swing, pre-emphasis setting, and resolution. For some implementations, the HPD handler 242 creates a list of settings and stores the list in registers/memory for easy access. For example, upon establishing a successful link between the source device 202 and the sink device 240, the HPD handler 242 may be configured to immediately store the optimum parameters in memory 250 in addition to updating a list of settings for managing and organizing the different sets of parameters. For example, the list may be used for removing outdated parameter settings.

Figure 3:
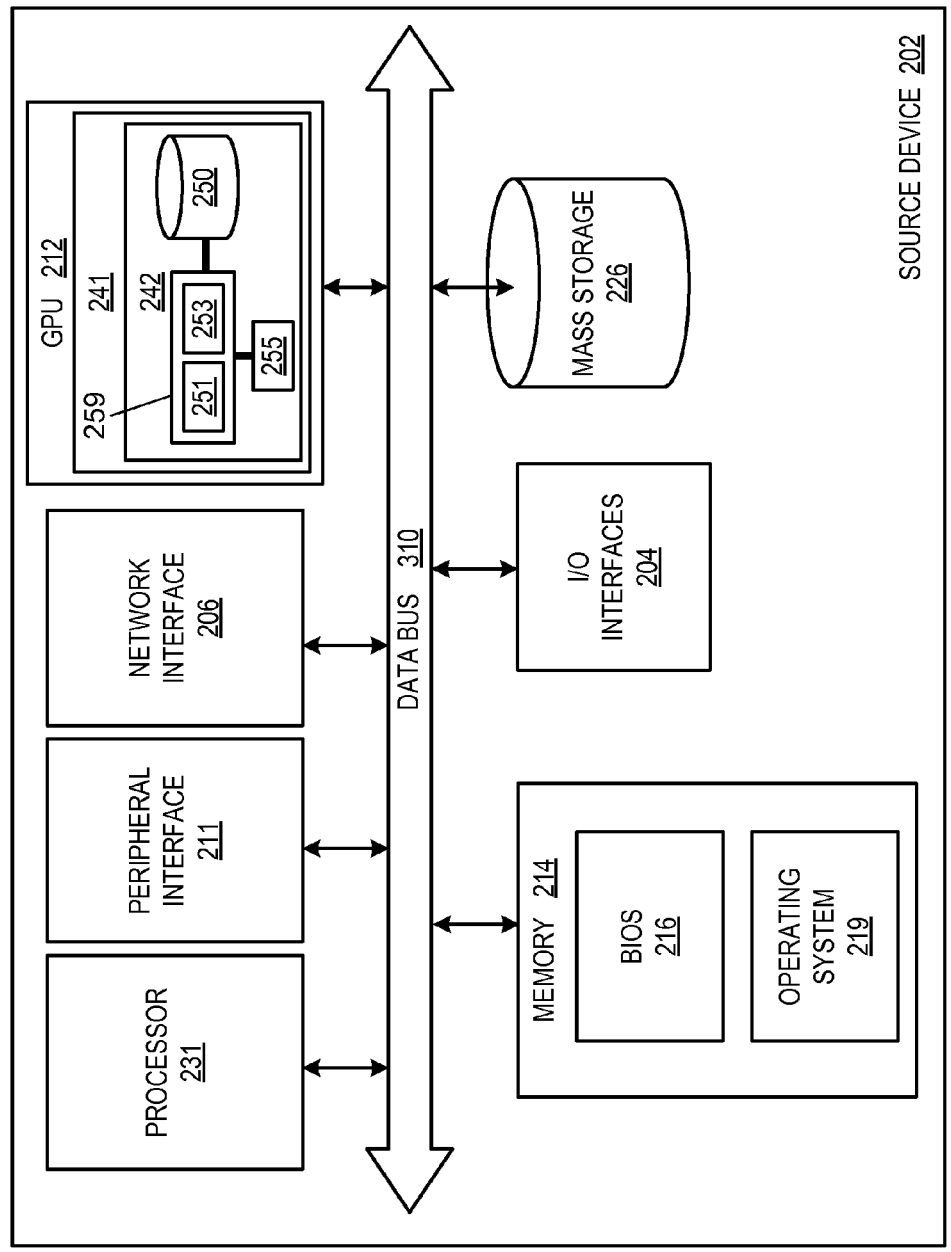
FIG. 3 illustrates a detailed view of the source device shown in FIG. 2.

FIG. 3 illustrates a detailed view of the source device 202 shown in FIG. 2. The source device 202 may be embodied in any one of a wide variety of wired and/or wireless computing devices, such as a desktop computer, portable computer, a dedicated server computer, multiprocessor computing device, and so forth. As shown in FIG. 3, the source device 202 comprises memory 214, a processor 231, a number of input/output interfaces 204, a peripheral interface 211, network interface 206, and mass storage 226, wherein each of these devices are connected across a local data bus 310.

The processor 231 may comprise any custom made or commercially available processor, a central processing unit (CPU) or an auxiliary processor among several processors associated with the source device 202, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 219, a BIOS 216 (which may be copied from ROM into memory 214), one or more native applications, emulation systems, or emulated applications for any of a variety of operating systems and/or emulated hardware platforms, emulated operating systems, etc.

Input/output interfaces 204 provide any number of interfaces for the input and output of data. For example, where the source device 202 is embodied as a personal computer, these components may interface with one or more user input devices, which may comprise a keyboard or a mouse (not shown). In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

The source device 202 further comprises a graphics adapter or graphics processing unit (GPU) 212 for interfacing with the sink device 240 (in FIG. 2), which may comprise an LCD display, television, or other display device. The GPU 212 includes the DisplayPort transmitter 241, which comprises the HPD handler 242 and the various components described in connection with FIG. 2, including memory 250, which is local to the GPU 212. Note, however, that the HPD handler 242 may be configured to also store and retrieve the predetermined parameters from memory 214 or mass storage 226 external to the GPU 212.

Figure 7:
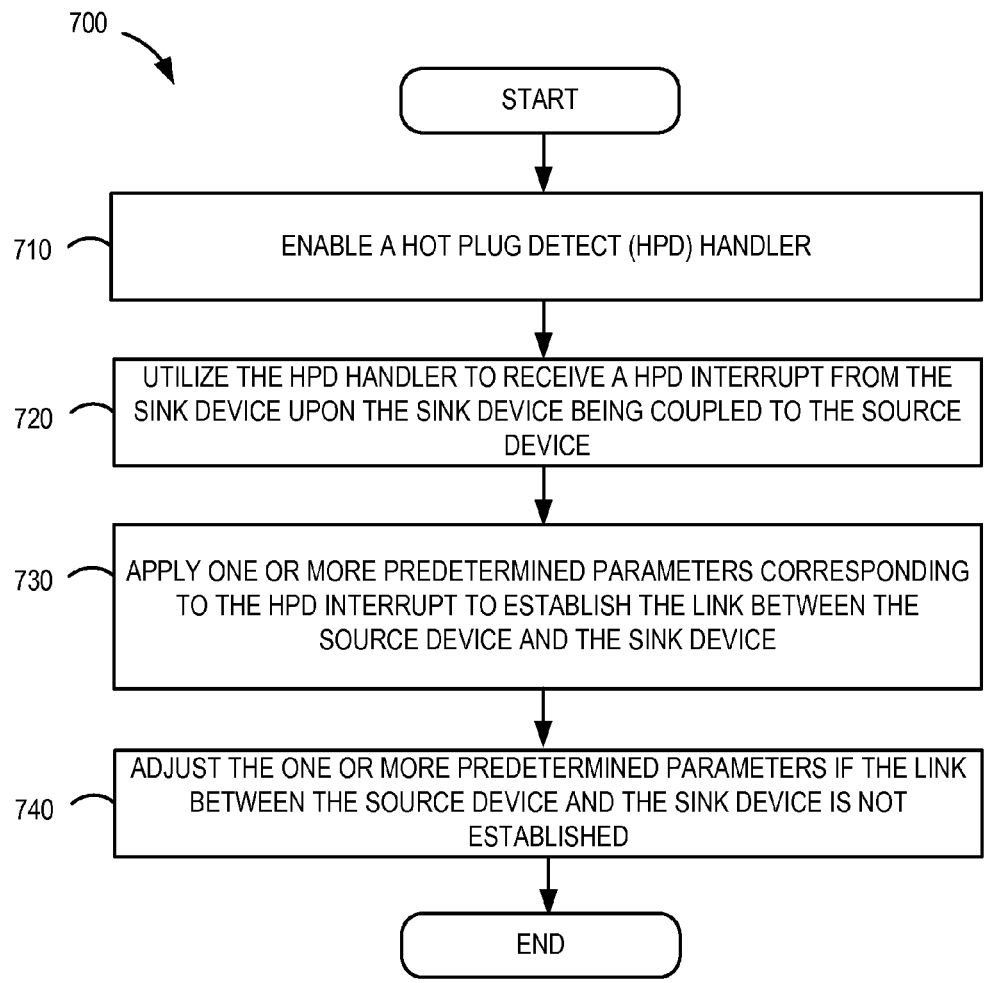
FIG. 7 depicts a top-level flow diagram for an embodiment of a method for performing HPD recovery.

Reference is made to FIG. 7, which is a flowchart 700 in accordance with an embodiment for performing the HPD recovery process described. If embodied in software, each block depicted in FIG. 7 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 2. The machine code may be converted from the source code, etc. If embodied in hardware, each block may represent a circuit or a number of interconnected circuits to implement the specified logical function(s).

Figure 5A:
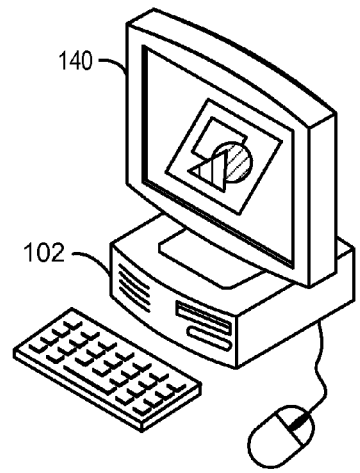
FIG. 5A is a system comprising a source device and a sink device.

It should be emphasized that the HPD handler 242 in FIG. 2 is not intended to completely replace a display driver if a display driver has been installed. Rather, the HPD handler 242 in the source device 202 complements the display driver (if one is installed) and takes action as needed. To further illustrate, reference is made to FIG. 5A, B. FIG. 5A illustrates a system comprising a source device 102 and a sink device 140. The source device 102 may comprise, for example, a desktop computer, computer workstation, or other computing platform. The sink device 140 may comprise, for example, a liquid crystal display (LCD), television, or other display. The source device 102 is typically coupled to the sink device 140 via a video cable such as a DisplayPort-compatible cable. As will be described in detail, inserting a cable between the source device 102 and the sink device 140 does not ensure that a successful link is established.

Figure 5B:
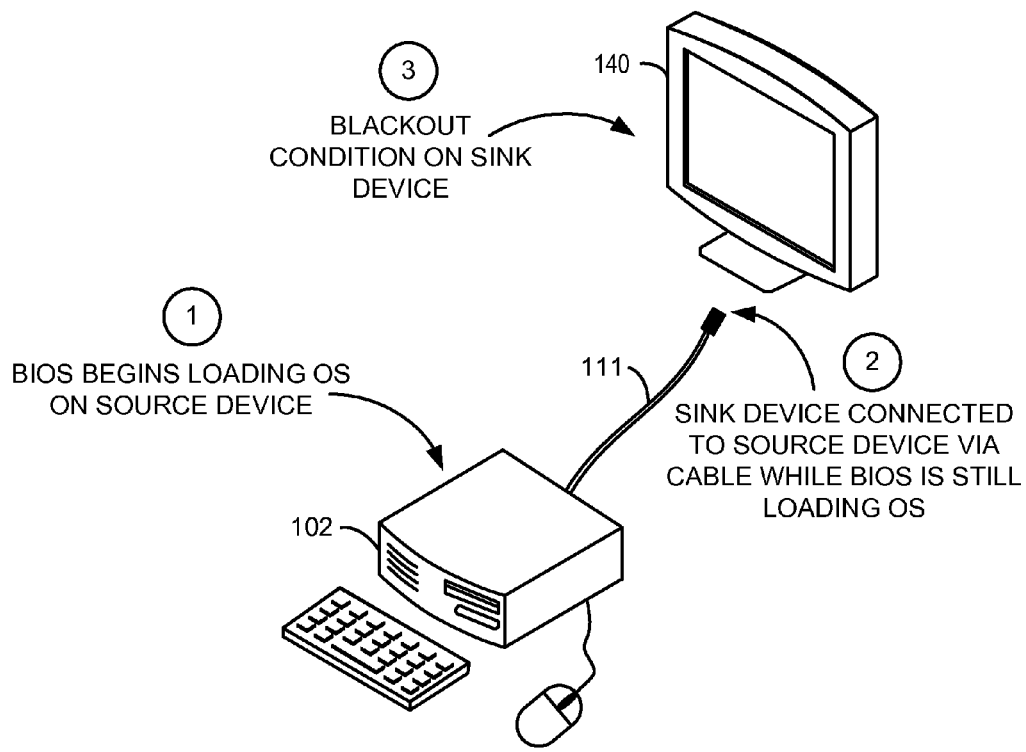
FIG. 5B illustrates a fault condition that can occur with conventional systems.

To illustrate, reference is made to FIG. 5B. FIG. 5B illustrates a scenario in which a blackout condition may occur with the sink device 140 where a link is not properly established between the source device 102 and the sink device 140, resulting in no content being displayed on the sink device 140. In an operating system (OS) environment, a properly installed display driver is capable of handling HPD interrupts by a handshake process over the AUX channel and thus responds to changes in the link status. However, if a sink device 140 is connected to the source device 102 while the display driver has not been loaded, a link is not established. In connection with the first operation shown in the illustration of FIG. 5B, the source device 102 is powered up and the BIOS begins loading the OS on the source device 102.

If the source device 102 includes a graphics card/adapter, then a video BIOS (VBIOS) is executed as well. In connection with the second operation shown in the illustration of FIG. 5B, the sink device 140 is connected to the source device 102 via the cable 111 (e.g., DisplayPort-compatible cable) while the BIOS is loading the OS onto the source device 102. Because the device driver has not been loaded onto the source device 102, a link is not established between the source device 102 and the sink device 140 even though a cable 111 has been installed. This results in a blackout condition on the sink device 140 shown as the third operation in FIG. 5B. To address this fault condition, an HPD handler is implemented, as described earlier in connection with FIG. 2.

Figure 6:
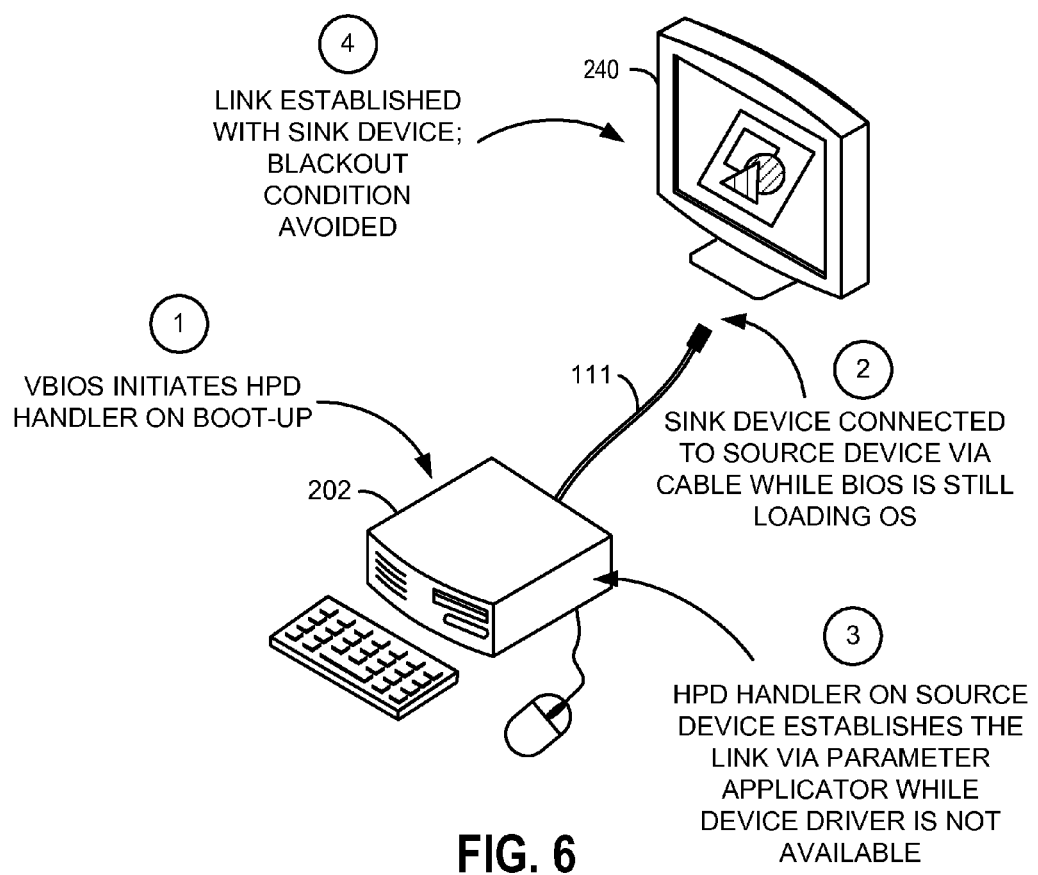
FIG. 6 illustrates operation of a hot plug detect (HPD) handler in accordance with various embodiments.

With reference to FIG. 6 and FIG. 2, the source device 202 is powered up and the BIOS/VBIOS executes. The VBIOS also sends an enable command to the enable module 255 in the HPD handler 242 (shown as the first operation in FIG. 6). For the second operation shown in the illustration of FIG. 6, the sink device 140 is connected to the source device 102 via the cable 111 while the BIOS is loading the OS onto the source device 102. For the third operation in FIG. 6, the parameter applicator 251 in the HPD handler 242 takes control and establishes a link between the source device 202 and sink device 240 while a display driver of the sink device is not loaded or not available.

The parameter applicator 251 cycles through various sets of parameters as necessary. A fault condition is avoided, and a link is established between the source device 202 and the sink device 240 (shown as the fourth operation in FIG. 6). In accordance with various embodiments, once the display driver has been loaded and is fully functional, the HPD handler 242 switches or transitions control back to the display driver. This may be accomplished, for example, by having the VBIOS issue a disable command to the enable module 255 in the HPD handler 242 to disable the HPD handler 242.

Although the flowchart 700 of FIG. 7 shows a specific order of execution, it is understood that the order of execution may differ from that which is depicted. In block 710, an HPD handler is enabled. For some embodiments, the HPD handler is enabled during boot-up of the source. In block 720, the HPD handler is utilized to receive an HPD interrupt from the sink device upon the sink device being coupled to the source device. In block 730, one or more predetermined parameters corresponding to the HPD interrupt are applied to establish the link between the source device and the sink device. In block 740, the one or more predetermined parameters are adjusted if the link between the source device and the sink device is not established.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for establishing a link between a source device and a sink device, comprising:
    booting up the source device, the source device physically coupled to the sink device;
    responsive to determining a device driver is unavailable for the sink device, enabling a hot plug detect (HPD) handler to receive an HPD interrupt from the sink device upon the sink device being coupled to the source device during the booting up;
    establishing a link between the source device and the sink device using the HPD handler; and
    disabling the HPD handler responsive to the device driver becoming available to the sink device.

2. The method of claim 1, wherein establishing comprises consecutively applying each set among all sets of predetermined parameters available to the source device until the link is established or all of the sets have been applied, the applying performed in response to receiving the HPD interrupt in an attempt to establish the link between the source device and the sink device.

3. The method of claim 2, further comprising adjusting the one or more predetermined parameters of the one or more sets of predetermined parameters if the link between the source device and the sink device is not established is performed on a parameter-by-parameter basis.

4. The method of claim 2, further comprising storing the one or more adjusted predetermined parameters if adjusting the one or more predetermined parameters of the applied sets of predetermined parameters results in the link between the source device and the sink device being established.

5. The method of claim 2, wherein applying each set of predetermined parameters comprises:
   retrieving a stored set among the sets of predetermined parameters, wherein the stored set of the sets of predetermined parameters comprises one or more parameters used for establishing a previous link between the source device and the link device; and
   applying the retrieved stored set.

6. The method of claim 1, further comprising
   transitioning control of the link to the display driver at a time corresponding to the disabling.

7. The method of claim 1, further comprising receiving a disable command to disable the HPD handler responsive to one of:
   establishing the link between the source device and the sink device; or
   loading of the device driver corresponding to the sink device.

8. The method of claim 1, wherein enabling the HPD handler comprises sending an enable command from a video basic input/output system (VBIOS) executing on a graphics card in the source device.

9. The method of claim 1, wherein enabling the HPD handler is performed during boot-up of the source device.

10. The method of claim 1, wherein the device driver comprises a DisplayPort driver.

11. The method of claim 1, wherein during a portion of the booting up, the source device and the sink device are physically decoupled temporarily.

12. A hardware apparatus for establishing a link between a source device and a sink device, comprising:
   basic input/output system (BIOS) software executing on a processor to boot up the source device and the sink device;
   an enable module configured to, responsive to determining a device driver is unavailable for the sink device, enable a hot plug detect (HPD) handler to receive a HPD interrupt from the sink device upon the sink device being coupled to the source device during boot up, and disable the HPD handler responsive to the device driver becoming available to the sink device; and
   a control module electrically coupled to the enable module, the control module configured to establish the link between the source device and the sink device using the HPD handler.

13. The apparatus of claim 12, wherein the control module comprises:
   a status monitor configured to monitor the HPD interrupt to determine whether the sink device has been electrically coupled to the source device; and
   a parameter applicator configured to apply plural sets of predetermined parameters to a graphics card of the source device based on a change of the HPD interrupt detected by the status monitor and if the device driver corresponding to the sink device has not been loaded, wherein the hardware apparatus is implemented in the graphics card of the source device.

14. The apparatus of claim 13, wherein the control module is configured to adjust the one or more predetermined parameters of the plural sets of predetermined parameters on a parameter-by-parameter basis.

15. The apparatus of claim 14, wherein the control module is further configured to store the one or more adjusted predetermined parameters in memory responsive to the link between the source device and the sink device being established.

16. The apparatus of claim 13, wherein the control module is further configured to retrieve a stored set of the plural sets of predetermined parameters from memory, wherein the control module is further configured to apply the retrieved stored set, wherein the stored set comprises one or more parameters used for establishing a previous link between the source device and the sink device.

17. The apparatus of claim 13, wherein the control module is further configured to consecutively apply the plural set of predetermined parameters.

18. The apparatus of claim 12, wherein the enable module is configured to disable the hardware apparatus according to a disable command received from a video basic input/output system (VBIOS) executing on a graphics card of the source device responsive to one of:
   the link between the source device and the sink device being established; or
   the device driver corresponding to the sink device being loaded.

19. The apparatus of claim 12, wherein the enable module is configured to enable the HPD handler based on receiving an enable command from the BIOS software during boot-up of the source device.

20. The apparatus of claim 12, wherein the hardware apparatus is a HPD handler implemented in a graphics card of the source device.

* * * * *